Figure 1:
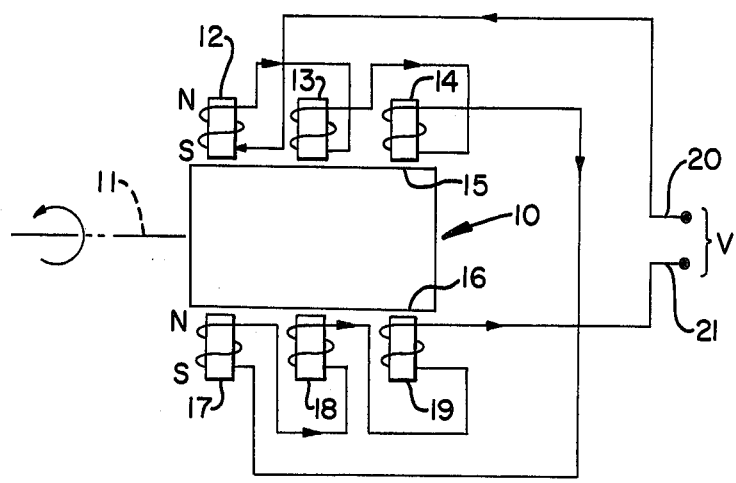

United States Patent [19]

Crockett

[11] 4,155,022
[45] May 15, 1979

[54] LINE FLOW ELECTRIC POWER GENERATOR

[75] Inventor: Emmet E. Crockett, LaFayette, La.

[73] Assignee: Otis Engineering Corporation, Dallas, Tex.

[21] Appl. No.: 803,214

[22] Filed: Jun. 3, 1977

[51] Int. Cl.² .............................................. H02K 19/16
[52] U.S. Cl. ..................................... 310/168; 290/52; 73/231 R
[58] Field of Search ............... 310/155, 154, 168, 111, 310/87; 73/231 R, 229, 231 M; 290/52, 54

[56] References Cited

U.S. PATENT DOCUMENTS

| 2,683,224 | 7/1954 | Cole, Jr. | 290/52 |
| 2,853,638 | 9/1958 | Bonnano et al. | 290/52 X |
| 3,208,269 | 9/1965 | Eccles et al. | 73/231 |
| 3,760,205 | 9/1973 | Imris | 310/168 |

*Primary Examiner*—Donovan F. Duggan
*Attorney, Agent, or Firm*—Warren H. Kintzinger

[57] ABSTRACT

An electrical power generator employing a helically-vaned in-line rotor in a flow line as a prime mover means and as an integral part of the generator by effecting a cyclic variation in the density of permanent magnet generated flux fields which pass through fixed coil windings. Output voltage magnitude varies with rotor rotation rate which, in turn, varies as the flow rate of gas and/or fluid in the line.

10 Claims, 9 Drawing Figures

U.S. Patent  May 15, 1979  Sheet 3 of 3  4,155,022

LINE FLOW ELECTRIC POWER GENERATOR

This invention relates in general to electric power generation and, in particular, to a method and means of obtaining electrical power from a flow of fluid or gas.

Considerable energy is oftimes available in the form of fluid or gas flow, as in the oil and gas industry. While it may be contemplated that this power could be utilized in driving some sort of fluid operated impeller which might in turn be employed as prime mover for an electrical generator, the primary object of this invention is to utilize such fluid and/or gas flow as a source of power for a compact and practical electrical power generating means which is containable compactly in-line with a primary flow tube or a regulated shunt line and which includes the fuid or gas flow driven impeller as an integral part of the electrical power generator.

A further object of the invention is the provision of an electrical power generating means requiring no external exitation means.

A still further object is the provision of an electrical power generating means which converts fluid and/or gas flow energy into electrical power, utilizing a minimum of moving parts.

Still another object is the provision of an electrical power generation means in a gas and/or fluid flow system requiring no external exitation and useable in a closed loop control system to regulate the rate of flow of the gas and/or fluid flow.

Features of this invention useful in accomplishing the above objectives include, in a fluid and/or gas powered electrical power generator, a helically vaned impeller means rotatably mounted within a fluid and/or gas flow pipe and caused to be rotatably driven by the flow imposed thereon. A plurality of permanent magnet means are either carried by the helical impeller, or fixed through the pipe wall, such that in either arrangement, the magnet poles are arranged in a helical pattern as defined by the rotor vane radial extremes. Windings, partially or completely fixed within the pipe wall are subjected to a variable flux flow therethrough as the helical impeller rotates by a cyclic variation in the reluctance presented to the flow path of magnetic flux generated by the permanent magnets as the helical vane edge extremes repetitively approach, become juxtaposed with and recede from a maximum flux density defined position with respect to low reluctance flux path means around which the winding is placed. An alternating voltage output is thus induced in the winding. Judicious placement of plural groups of magnets, and combining outputs from plural windings associated therewith, may be employed to produce a useable voltage level output with magnitude proportional to the rotor vane rotation rate and thus the fluid and/or gas flow rate.

Specific embodiments representing what are presently regarded as the best mode of carrying out the invention are illustrated in the accompanying drawing.

Figure 2:
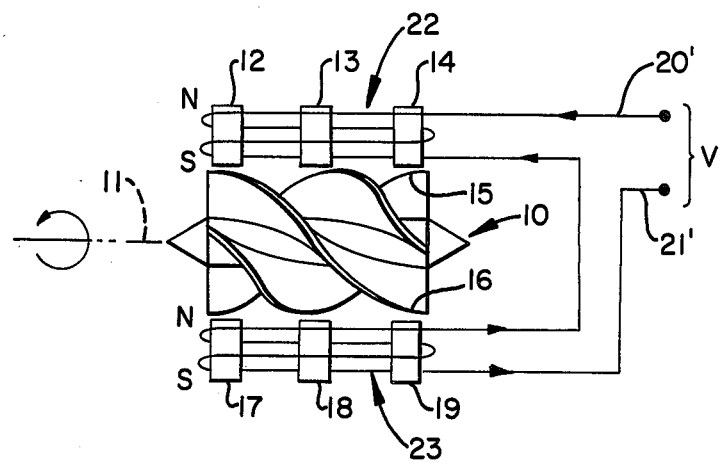
Figure 3:
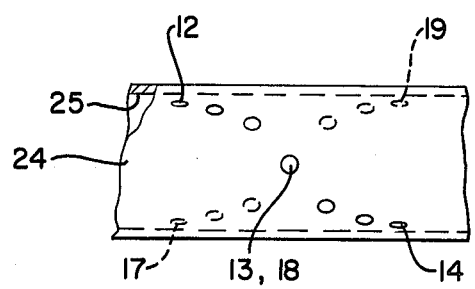
Figure 4:
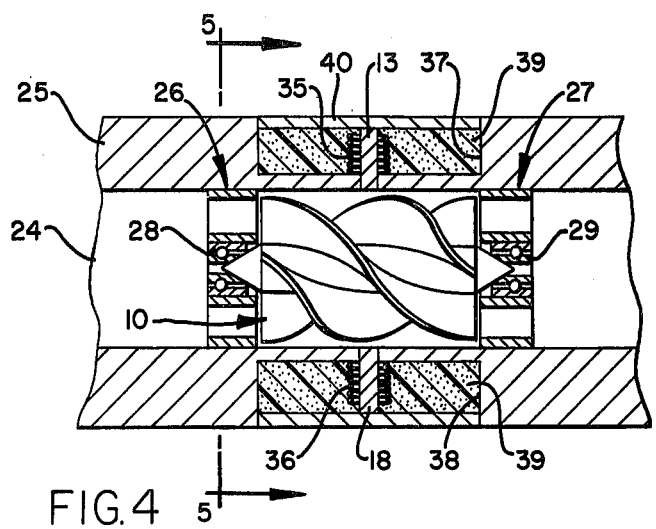
Figure 5:
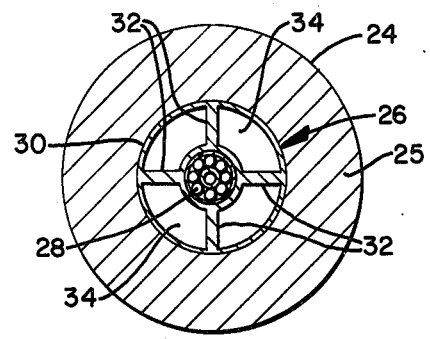
Figure 6:
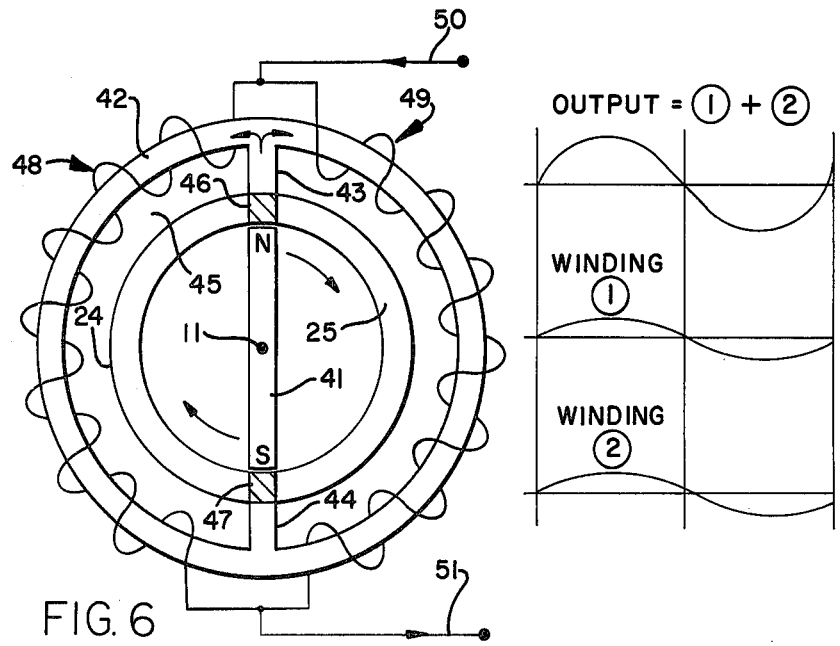
Figure 7:
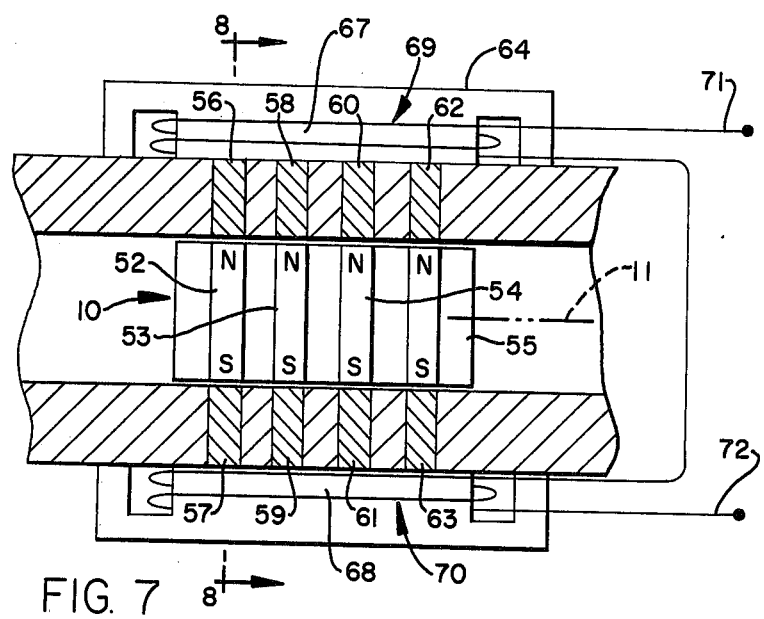
Figure 8:
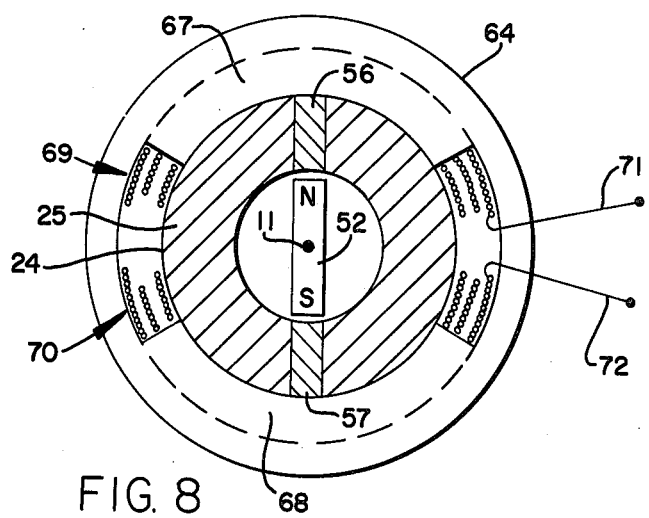

In the drawings:

FIG. 1 represents a functional diagram of the basic operating principle of a first embodiment of the invention;

FIG. 2, a functional diagram of an alternative winding arrangement useable with the embodiment of FIG. 1;

FIG. 3, a diagramatic representation of magnet grouping in helical patterns conforming to that defined by helical vane edge extremes of a rotor carried within a flow pipe;

FIG. 4, a partial cross section of an in-line electrical power generator employing the embodiment principal of FIGS. 1 and 2;

FIG. 5, a section along line 5—5 of FIG. 4, showing impeller mounting means;

FIG. 6, a functional end-view diagram of a further embodiment, utilizing impeller carried magnet means and flow pipe low reluctance iron inserts;

FIG. 7, a functional side view diagram of the embodiment of FIG. 6;

FIG. 8, an end view taken along line 8—8 of FIG. 7; and

Figure 9:
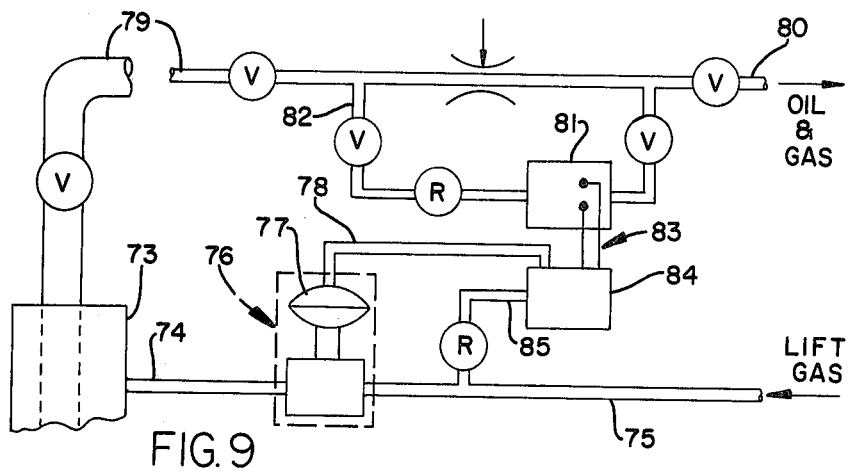

FIG. 9, a functional diagram of a well head flow control system embodying the flow line electrical power generator to regulate oil and gas flow induced from a lift gas source.

Referring to the drawings:

In either of the embodiments to be described—electrical energy is generated by variation of the flux passing through a fixed coil means with the flux being generated by permanent magnets, and the variation in flux passing through the coil being effected by rotation of a helically vaned impeller mounted within a gas and/or fluid flow pipe.

In a first embodiment, as depicted in FIGS. 1-4, a group, or groups, of magnets are inserted in the wall of the flow tube, each group arranged in a helical pattern so as to conform with the periphery of the longiudinal extent of the helical rotor vane in the flow tube. A coil winding, which may be imbedded in the flow tube wall is oriented so as to surround each magnet or magnet group. The rotor vane is constructed from a low reluctance material. Rotation of the rotor vane causes helical vane edge extremes to repetitively approach, be juxtaposed with, and recede from each magnet group or groups, thereby varying the amount of flux cutting the associated coil from maximum to minimum at a rate defined by the rotation speed of the helically vaned rotor, and generating in the winding means a voltage output with magnitude proportioned to rotor vane rotation rate and thus the fluid flow rate.

Referring to FIG. 1, the first embodiment is functionally illustrated as comprising a helical vane member 10 rotatable about axis 11. Although not specifically shown in FIG. 1, vane member 10 would comprise the longitudinal extent, or a portion of the longitudinal extent, of a helically vaned rotor mounted within a flow pipe so as to be rotated by the gas and/or fluid flow through the pipe. A first group of magnets 12, 13 and 14 is arranged along a helical path corresponding to that defined by the helical vane edge extremes. As will be further described, the group of magnets may be inserted through the wall of a flow tube such that like-pole ends thereof are juxtapositionable with the respective edge extremes 15 and 16 of the helical rotor vane 10 as the vane rotates. A further group of magnets 17, 18 and 19 is arranged along a diametrically opposite helical path, and likewise inserted through the wall of the flow tube, with like-poled ends (opposite those of the magnets 12-14) juxtapositionable with the rotor vane edge extremes.

In FIG. 1, windings are placed around each of the magnets and seriesaiding interconnected, as shown, such that e.m.f. induced at output terminals 20 and 21 is the sum of those e.m.f.'s induced in the six windings exampled in FIG. 1. With helical rotor 10 comprising a low relucance material, rotation of rotor 10 varies the reluctance presented to the magnetic field generated by the magnets from a minimum value with vane edge extremes juxtaposed with magnet ends, to a maximum value with the vane edges displaced 90° from the juxtaposed position, thereby varying the flux cutting the windings in a sinusoidal fashion with rotor rotation, and generating a voltage output at terminals 20, 21, the magnitude of which is determined by other rate of rotation of rotor 10 which defines $d\phi/dt$ (rate of change of flux).

Referring to FIG. 2, an embodiment similar to that of FIG. 1, shows an alternative winding arrangement, with a first winding 22 placed around the group of magnets 12, 13 and 14, and a second winding 23 placed around the diametrically opposite group of magnets 17, 18 and 19, with windings 22 and 23 series-aiding interconnected to produce an output at terminals 20″-21′.

The magnet groups of FIGS. 1 and 2 are depicted in FIG. 4 as being inserted through the wall 25 of a flow tube 24, and arranged along diametrically opposite helical paths as could be defined by a helical rotor vane shown rotatably mounted in the flow tube 24. The number of magnets in each group of FIG. 3 is shown to be greater than the exampled groups of three in FIGS. 1 and 2, the number generally being optional. For comparative reference, diametrically opposite magnet pairs 12-17, 13-18, and 14-19 are referenced in correspondence with the respective end and control pairs of FIGS. 1 and 2.

With reference to FIG. 4, flow tube 24 is depicted with helical rotor 10 rotatably mounted within the flow tube. Rotor 10 is rotatably supported within tube 24 by respective end spider assemblies 26 and 27 which may comprise bearing means 28 and 29 for receiving respective shaft ends of rotor 10. As depicted in FIG. 5, the spider assembly 26 is shown as an annular ring 30 received and positioned within flow tube 24. Arm members 32 depend inwardly from ring 30 to support a central bearing hub within which suitable bearing means 28 may be placed to rotatably mount the shaft of rotor 10. Spider through-passages 34 allow gas and/or fluid flow in flow tube 24 to impinge on rotor 10 to rotate same, and the spider annular ring, arm members and hub may be appropriately shaped to present a minimal impedance to the fluid and/or gas flow in tube 24.

FIG. 4, representing a partial cross section along line 4-4 of FIG. 3, shows the central magnet pair 13-18 as being inserted through the flow tube wall 25 so as to have magnet ends juxtapositionable with the vane edges of rotor 10. Windings 35 and 36 of FIG. 4 may represent either of the alternative winding approaches of FIGS. 1 and 2 which are exampled as being carried within the tube wall confines by means of appropriate slots 37 and 38 form in the tube wall. Epoxy filler 39 may encapsulate the respective windings and outer protective sleeve 40 may provide an environmental shield.

In the embodiment of FIGS. 6, 7 and 8, fixed windings are employed and magnets imbedded in, or otherwise integrally carried by, the rotor vane 10, effect a variation in flux cut by the windings as the rotor turns. Referring to the functional diagram of FIG. 6, a magnet 41 carried by rotor 10 (not shown) rotates about the helical rotor axis 11 within the confines of flow tube 24. An outer iron ring 42 is positioned concentrically about the flow tube and formed with inwardly projecting shoes 43 and 44 that rest on the outer surface of flow tube 24, with a gap 45 defined between iron ring 42 and flow tube 24. Shoe 43 communicates with a low reluctance iron insert 46 which extends through the flow tube wall 25. Shoe 44 communicates with a low reluctance iron insert 47 which extends through the flow tube wall 25. With the magnet 41 positioned with pole ends addressing respective iron inserts, a low reluctance path is provided for flux which flows out of the magnet north pole, divides around respective halves of ring 42, and enters the magnet south pole. Ring windings 48 and 49 are placed around ones of the respective iron ring halves and series-aiding interconnected as shown such that the e.m.f. induced at output terminals 50-51 is the sum of the e.m.f's induced in the windings. With rotation of magnet 41 about axis 11, an alternating current potential is present at the output terminals.

FIG. 7 represents a functional longitudinal view of the FIG. 6 embodiment, showing vane rotor 10 as a planar member for illustrative purposes only, it being understood that rotor 10 of FIG. 7 would be a helical vane so as to be driven rotatably by gas and/or fluid flow impinging thereon. Rotor 10 carries, by way of example, four diametrically extending magnets 52-55 with the pole ends of each being juxtapositioned with respective magnetic iron insert pairs 56-57, 58-59, 60-61, and 62-63. Each of the iron insert groups (56, 58, 60, 62) and (57, 59, 61, 63) would be arranged in a helical pattern in the tube wall as defined by the helical rotor vane edges (low reluctance iron inserts now replacing the magnets of FIG. 3).

In FIG. 7, coiled windings around shoes are illustrted (alternative to the ring winding depicted in FIG. 6). An annular ring member 64 of low reluctance material is placed concentrically about the flow tube outer wall. Ring ends extend radially inwardly to address the flow tube outer surface. With referance also to FIG. 8, an upper shoe member 67 projects radially inwardly to address the flow tube outer surface portion through which iron insert group 56, 58, 60, 62 extends. A lower shoe member 68 projects radially inwardly to address the flow tube outer surface portion through which the diametrically opposite iron insert group 57, 59, 61, 63 extends. A first winding 69 is extended around upper shoe 67 and within the confines of ring 64, with a second winding 70 extended around lower shoe 68. As depicted in FIG. 7, windings 69 and 70 are series-aiding interconnected to provide an a-c output across output terminals 71 and 72 which is the sum of the e.m.f.'s induced in the two windings.

The electrical power generator herein described produces an output with level proportional to the rate of gas and/or fluid flow which rotates the helically vaned rotor. As such, the device lends itself to unique incorporation in gas lift installations in the oil production industry, where production flow of oil and gas is induced by application of lift gas to the well. Generally, and as functionally depicted in FIG. 9, the production rate of a well flow line may be regulated in a closed-loop system employing the flow line a rate to drive the power generator whose output, in turn, controls the application of lift gas to the well, i.e., a reduction in flow line output rate causes an increase in lift gas application to increase flow rate, and vice versa. FIG. 9 functionally depicts a well head member 73 to which lift gas is applied on line 74. Lift gas from supply line 75 is supplied to line 74 through motor valve 76 which comprises a valve mechanism controlled by the application of comparatively low pressue gas on bellows 77 input line 78. Output flow line 79 delivers an output flow of gas and- /or oil to produce an output flow at 80 with flow rate determined by the lift gas application through motor valve 76. An electrical power generator 81 of the aforedescribed type is shown connected in a regulated shunt line 82 off the flow line 79. Output 83 from electrical power generator 81 is applied to an electrically operated pressure regulator 84. A regulated pressure line 85 is connected to feed regulator 84, with the output line 78 being applied as controlling input to motor valve 76. Regulator 84 may then respond to increased flow rate in flow line 79, as manifested by an increased voltage level input 83 from power generator 81, to vary the pressure in motor valve control line 78 to proportionally decrease the lift gas application to the well, thus reducing output flow. In a closed-loop control fashion, this rate of flow in flow line 79 is thus automatically regulated.

The present invention is seen to provide an electrical power generating means for insertion into a fluid and/or gas flow line, utilizing a helical rotor propelled by and at a rate defined by the flow rate. The rotor serves as an integral part of, as opposed to a prime mover for, the electrical power generating means, by varying the fluid passing through fixed windings at a rate defined by flow rate in the line. Use of permanent magnet means precludes depending on external exitation, thus permitting remote location.

Whereas this invention is herein illustrated and described with respect to several embodiments thereof, it should be realized that various changes may be made without departing from essential contributions to the art made by the teachings hereof.

I claim:

1. Electrical power generating means comprising a tubular member through which a stream of liquid and/or gas may be caused to flow; a helically-vaned rotor member rotably mounted within said tubular member about an axis coincident with the longitudinal axis of said tubular member; means for generating an electromagnetic flux field at least partially within the confines of said tubular member; winding means fixed mounted with respect to said tubular member and at least partially surrounding said flux field; means including said rotor member for providing a cyclically variable reluctance path for said flux field as a function of the rotational position of said rotor with respect to said tubular member; output terminal means connected to said winding means, whereby a cyclically variable voltage potential is developed at said output terminals, upon rotation of said rotor, with voltage magnitude a function of the rotation rate of said rotor member; and with said variable reluctance path defined in part by plural low-reluctance material insert means extending through the wall of said tubular member and arranged in a helical pattern corresponding to the helix defined by the radial edge extremes of said rotor member.

2. The power generating means of claim 1, with said means for generating said flux field comprising a plurality of permanent magnets carried by one of said rotor means and said rotor member.

3. The power generating means of claim 2 with diametrically opposite disposed groups of plural inserts, each group comprised of inserts disposed in a helical pattern conforming to the helix defined by the radial edge extremes of said rotor member, said groups comprising respective portions of said variable reluctance path, with said winding means comprising plural series-aiding interconnected windings placed around said variable reluctance path.

4. The power generating means of claim 3, with said permanent magnets affixed to and being an integral part of said rotor means, respective magnet pole defining extremes of said magnets positioned substantially at diametrically opposed radial extremes of said rotor means, said low reluctance material insert means being comprised of a low reluctance substance, and a low reluctance material means interconnecting one insert group with the other.

5. The power generating means of claim 4, with said low reluctance material interconnecting means comprising a ring member extending in spaced separated concentricity about said tubular member, with a pair of radially inwardly extending shoe extensions thereof resting on the outer surface of said tubular member and respectively in contact with individual ones of said groups of said inserts.

6. The power generating means of claim 5, with said winding means comprising respective ring windings placed about the wall of said ring member.

7. The power generating means of claim 5, with said winding means comprising respective windings respectively placed about each of said inwardly extending shoe extensions.

8. The power generating means of claim 3, with said permanent magnets comprising said low reluctance material insert means and extending through the wall of said tubular member, and said rotor member being comprised of a low reluctance substance.

9. The power generating means of claim 8, with said winding means comprising series-aiding interconnected windings, said winding placed around a different one of said insert groups.

10. The power generating means of claim 9, with said winding means comprising a plurality of series-aiding-interconnected windings, individual ones of which are placed around a different one of each of said inserts.

* * * * *